Patented Aug. 12, 1947

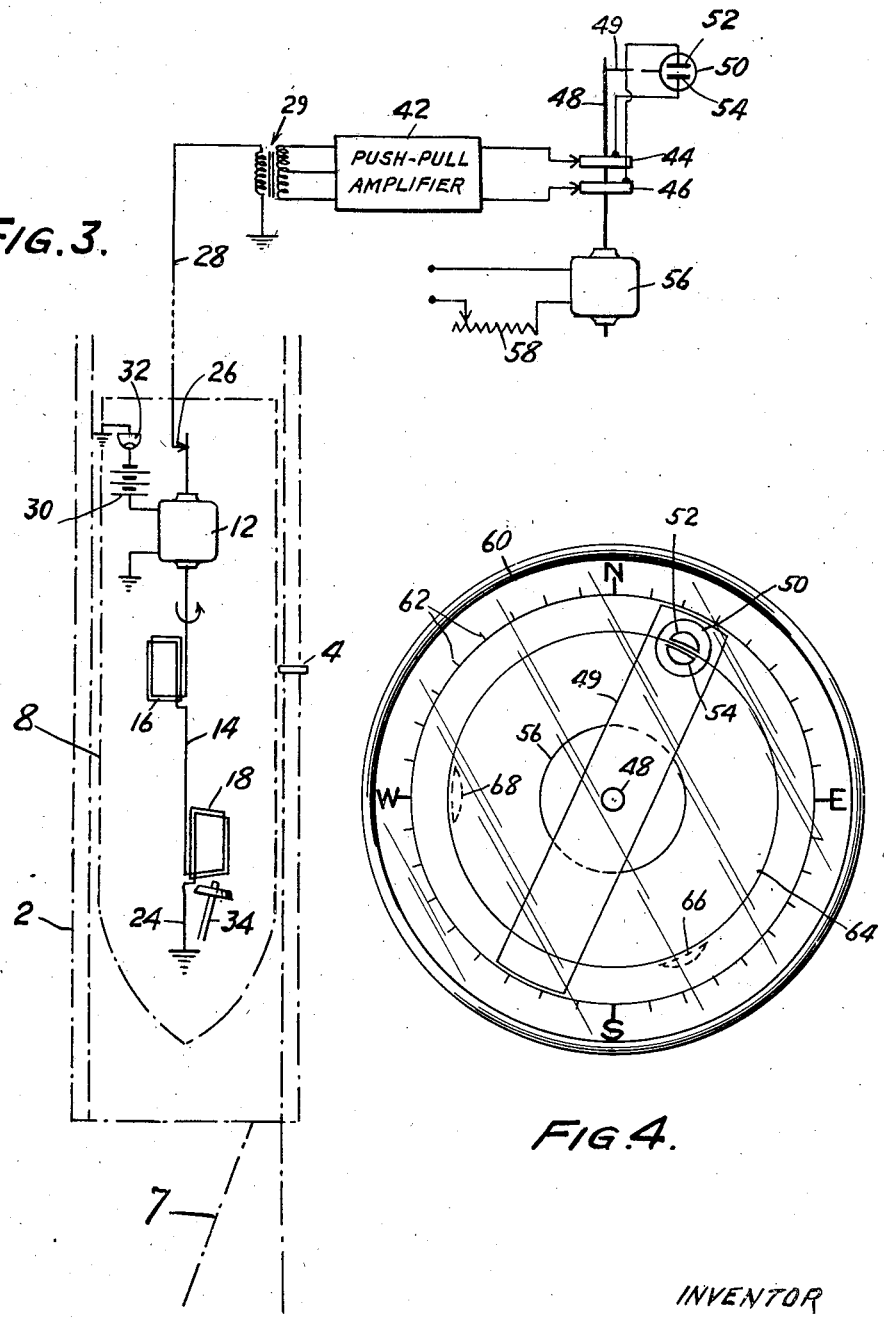

2,425,319

UNITED STATES PATENT OFFICE 2,425,319

TOOL ORIENTING METHOD AND APPARATUS

Donald Hering, Long Beach, Calif., assignor to Sperry-Sun Well Surveying Company, Philadelphia, Pa., a corporation of Delaware Application December 23, 1942, Serial No. 469,867

20 Claims. (Cl. 255—1.6)

This invention relates to a method and apparatus for orienting drill stems, and more particularly to a method of orienting drill stems for the purpose of directional drilling.

There is disclosed in Hyer Patent 2,120,670, dated June 14, 1938, a method of orienting drill stems, especially for the purpose of orienting tools, which has been widely and satisfactorily used. In accordance with this method, all mechanical interconnections between a surveying instrument and drill stem are avoided, the operative interconnection between a surveying instrument and the drill stem being effected through the medium of a magnet located in a portion of the drill stem and adapted to attract a compass within a surveying instrument, desirably of a recording type. Somewhat similar methods of orientation are described in the patents to Hewitt et al. 2,144,061 and 2,154,162, dated, respectively, January 17, 1939, and April 11, 1939, in the patents to Smith 2,179,832 and 2,187,367, dated, respectively, November 14, 1939, and January 16, 1940, and to Bremner et al. 2,207,505, dated July 9, 1940, and in the application of Smith, Serial No. 414,160, filed October 8, 1941.

All of these orienting methods involve in common the lowering into a drill stem of a recording surveying instrument the records of which are related in some fashion with a direction of asymmetry of a tool. The fact that the instruments are of recording type involves the necessity for lowering the instrument in each case to a predetermined location in the drill stem, permitting it to remain there for a sufficient time to make a record, withdrawing the instrument from the drill stem, removing and examining the record, and only then locating the drill stem in such position as to face the tool in the proper direction. During the period of withdrawal of the instrument, it is not necessary that the drill stem be stationary provided suitable markings are made at the surface to indicate the position of the drill stem at the time the record was being made by the surveying instrument. In general, however, the running of the instrument into the drill stem, its removal and the development and examination of the record necessitated a substantial loss of time during which drilling progress must be interrupted.

It is the general object of the present invention to provide an improved orienting method and apparatus whereby the same fundamental principles are involved as in the various methods and apparatus of the aforementioned patents and application, but nevertheless the time consumed is substantially shortened by reason of the fact that the instrument, instead of making a record, is adapted to signal to the surface the condition of orientation which has been achieved.

Specifically, in accordance with the present invention, there is lowered into the drill stem to a point adjacent its lower end carrying a tool a surveying instrument which will signal to the surface the relationship between a magnet located in definite azimuthal position relative to the tool and an azimuthal reference direction which may be, for example, the known direction of inclination of the hole.

The general object just indicated, as well as specific objects of the invention relating to details, will become apparent from the following description, read in conjunction with the accompanying drawing, in which:

Figure 3 is a diagram showing primarily the electrical connections of the apparatus and indicating certain of the mechanical relationships of the parts; and Figure 4 is a plan view showing the type of indicating device located at the surface and from which the orientation may be ascertained.

Figures 1, 2:
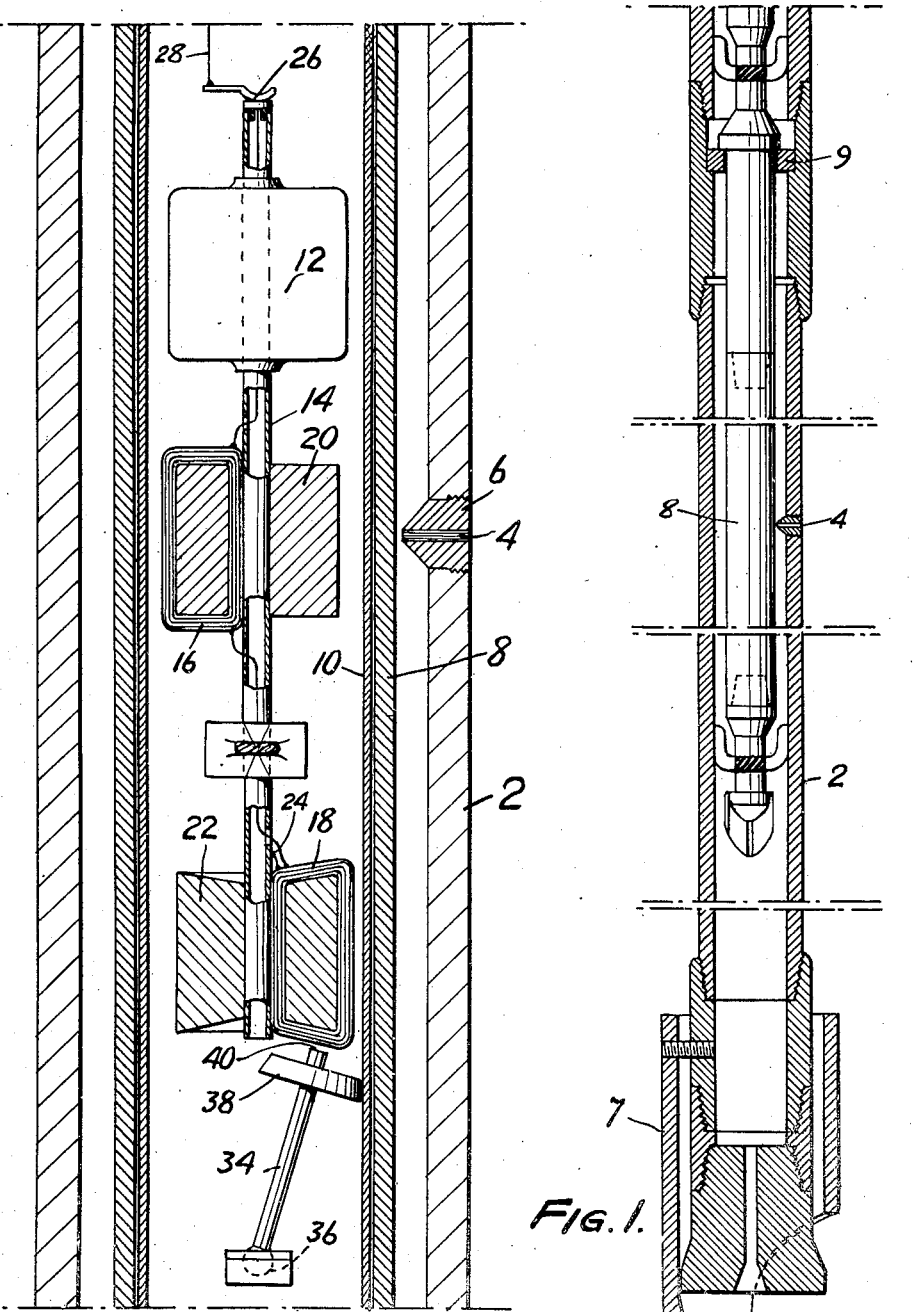
Figure 1 is a longitudinal sectional view showing the assembly of parts attained at the time the surveying instrument is signalling the orientation data to the surface.
Figure 2 is an enlarged longitudinal section through the drill stem and the surveying instrument therein showing certain of the operating parts thereof.

A drill stem made up of sections in the usual fashion carries in its lower portion a sub indicated at 2 above the bit and the tool, here represented as a whipstock 7, carried by the lower end of the drill stem by means of a shear pin in usual fashion. The assembly thus illustrated is conventional and may involve the more elaborate assembly of parts illustrated in the patent to Kothny 2,298,706, dated October 13, 1942.

The sub 2 may be formed of either magnetic or non-magnetic material, depending upon the particular type of interior apparatus used. In the modification illustrated, this sub may be of steel or other magnetic material and carries a magnet 4 located within plug 6 of non-magnetic material such as bronze or the like, serving to separate the magnetic material of the sub from the magnet so that the field of the magnet is not suppressed and extends to a substantial degree within the opening in the drill stem.

Arranged to be lowered within the drill stem upon a cable which, in the present instance may contain a single conductor, though additional conductors may be provided if it is desired to transmit electrical power from the surface, is a protective casing 8, adapted to seat on a ring 9, as indicated in Figure 1, within which protective casing there is located a surveying instrument 10 of novel type. The devices within the surveying instrument are partially indicated in physical form in Figure 2 and diagrammatically in Figure 3. They comprise a motor 12 having a shaft 14 preferably of tubular form. This tubular shaft carries a pair of coils 16 and 18, located at different levels and electrically connected in series, one end of the coil 18 being grounded as indicated at 24 through the shaft and its bearings. The coils 16 and 18 are preferably carried by members 20 and 22, respectively, of soft iron for the purpose of minimizing the reluctance of the magnetic circuits hereafter described, thereby to promote the generation of a maximum induced electromotive force. The lead from the upper coil 16 is electrically joined through a brush 26 to a conductor 28 in the cable which supports the surveying instrument and runs to the surface. The upper end of this conductor is connected (for example through a conventional slip ring and brush arrangement) to the input transformer 29 of a push-pull amplifier 42. It will be evident that a single coil may be used instead of the pair 16, 18 if proper precautions are taken to avoid any conflict of the fields of the magnets 4 and 34 such as might cause 34 to be attracted by magnet 4 to an incorrect position.

The motor 12 is arranged to be driven by means of a battery 30 contained in the surveying instrument, though if desired, it may be driven by the introduction of power current through another conductor in the supporting cable, though with suitable filtering the power may be supported through the same cable which transmits the impulses. If a battery 30 is used, as is convenient since the motor 12 may be of quite small size, it is desirable to provide in the motor circuit a mercury switch 32 arranged to make contact only when the instrument is substantially upright within the normal deviations of a hole from the vertical, so that the motor will be run and tend to drain the batteries only when the surveying instrument is in use, the instrument at other times being desirably kept in a substantially horizontal position.

Adjacent the lower coil 18 there is arranged a means for indicating a known azimuthal reference direction comprising a magnet 34 mounted in a universal pivot 36, the upper end of the magnet indicated at 40 closely approaching the path of rotation of the lower turns of the coil 18. Surrounding the upper end of the magnet 34 is a disc 38 of non-magnetic material which will bear against the inner wall of the surveying instrument casing 10 and, when the instrument is inclined to the vertical, will seek the lowermost portion of that wall, so indicating a known azimuthal reference direction.

The output of the push-pull amplifier 42 is fed to brushes making contact with slip rings 44 and 46, which are in turn electrically connected to the electrodes 52 and 54 of a glow tube 50 of the common neon or argon type. The slip rings 44 and 46 are carried by a vertical shaft 48 to an arm 49 of which the glow tube is secured at a substantial distance from the axis of rotation, desirably with the electrodes arranged as indicated in Figure 4, i. e., at different distances from the axis of rotation with the separating region between them extending substantially circumferentially. The connections between the slip rings and the electrodes are, of course, made through or along the shaft 48. The shaft 48 is arranged to be driven by means of a motor 56, the speed of which is adjustable, for example, through the medium of a rheostat 58. As will be evident hereafter, the range of speed adjustment of the motor 56 should be such as to correspond with the normal range of speed of the motor 12, the speed of which may vary as the batteries 30 are drained. The speed of this motor is not at all critical, and it may be of an ordinary small direct current type. All that is necessary is that it should be possible to operate the motor 56 at essentially the same speed at the time of performing an orientation.

The glow tube 50 is arranged to rotate adjacent a compass rose or azimuth circle indicated at 60, which carries graduations 62 indicative of azimuthal directions. If the compass rose is provided on a glass cover plate over the rotating glow tube and associated parts, this plate may also desirably carry a circle 64 coincident, during the rotation, with the region dividing the electrodes 52 and 54. This makes it possible more readily to distinguish the flashes of the electrodes which are inside and outside the circle 64 and hence to be distinguished from each other.

In the use of the apparatus described, the instrument contained in the protective casing 8 is lowered into the drill stem carrying the whipstock 7 at its lower end which, at the time, will have an unknown orientation and will be located at the bottom of the bore hole generally slightly above the lower end thereof. As the instrument passes down the drill stem, the motor 12 will operate to spin the pick-up coils 16 and 18, the latter through the field of the magnet 34 which, during the descent, will, of course, oscillate about the axis of the instrument so that the indications at the surface will be meaningless. When the instrument comes to rest on the supporting shoulder, the coil 16 will be rotating opposite the magnet 4, so as to cut its field, and the magnet 34 will then come to a rest position with its disc 38 engaging the lowermost side of the housing 10, assuming the hole to be sloping even slightly at the position of the whipstock.

The position of the magnet 4 with respect to the condition of asymmetry of a tool (for example, the direction of the face of a whipstock) having been noted at the surface during assembly, it will be evident that from this, an indication of the angular relationship between magnets 4 and 34 and a knowledge of the direction of slope of the hole from a previous survey, the azimuthal position of the tool may be ascertained. The direction of slope with respect to the earth need, however, not be known if the straightening or deviation to be effected is only to be relative to the low side of the hole, so that in some cases, the results of a previous survey are unnecessary. The apparatus determines the angular relationship between the magnets as follows:

The push-pull amplifier 42 is so designed that the two symmetrical parts thereof are normally biased to cut-off, with the result that pulses of voltage will be applied to the outer electrode 52 and the inner electrode 54 individually corresponding to the cutting of the respective magnetic fields by the coils 16 and 18. For the sake of simplicity, let it be assumed that the electrode 52 is energized by the pulses produced in the coil 16 and the electrode 54 is energized by the pulses produced in the coil 18, these coils being wound in proper relationship to the polarity of the magnets that the induced electromotive forces of the pulses are opposite in sign. If a single coil is used the magnets will be correspondingly arranged so as to give opposite pulses.

Before adjusting the rheostat 58, if the speed of the motor 56 differs from that of the motor 12, there will thus be produced stroboscopic flashes of light travelling forwardly or backwardly about the compass rose on the opposite sides of the circular line 64. If, now, the speed of the motor 56 is adjusted to correspond with the speed of rotation of the motor 12, the flashes will become stationary, the attainment of this condition indicating, of course, that the two motors do correspond in speed (assuming that it is known that they run approximately at the same speed.)

From previous surveying of the hole, there will be known the azimuthal direction of the inclination of the hole. The setting of the rheostat 58 may now be slightly changed so as to cause the motor 56 to have a speed either slightly greater or slightly less than that of the motor 12, with the result that flashes of the electrode 54 will progress slowly around the compass rose until they appear at the azimuthal position corresponding to the direction of deviation of the hole, whereupon the rheostat 58 may be again adjusted to attain a constant speed of the motor 56 corresponding to that of the motor 12 to cause the flashes to appear stationary. This stationary condition of the flashes of the electrode 54 is indicated at 68 and will result in a streak of light slightly longer than the circumferential dimension of the electrode in view of the fact that the pulse persists through a small angular movement of the coil 18 and the electrode 54. Alternatively, an arbitrary stationary position of the flashes may be secured and the compass rose then rotated to the aforesaid position.

At this same time, the flashes of the electrode 52 will appear as a similar short streak of light at 66 which will also be stationary and which will indicate the position of the magnet 4. Since the magnet 4 bears a known relationship to the direction in which the sloping face of the whipstock points, there may thus be directly determined from the position of the flashes 66 with respect to the compass rose the direction in which the whipstock is then facing.

It will be evident that the convention adopted in the arrangement of the various parts is rather arbitrary. With various relative positions of the coils 18 and 16 with respect to each other about the shaft 14 and corresponding positions of the magnet 4 with respect to the whipstock face, as well as the arrangement within the amplifier itself, the direction in which the whipstock faces may be directly indicated on the rose. The arrangement and conventions used must, of course, be tied up with the particular arrangement of the various parts of the apparatus as just indicated.

If it is desired to face the whipstock in some other direction, the drill stem is now turned at the surface through the proper angle, preferably accompanied by spudding, and upon readjustment, the motor 56 may be again speeded up or slowed down to bring the flashes 68 again to the direction on the compass rose corresponding to the direction of the inclination of the hole, or alternatively, the compass rose may be rotated to achieve this condition. The flashes 66 will then again indicate the position of the whipstock in its newly adjusted location. If the turning of the drill stem failed to achieve the desired position, the operation may be repeated until the whipstock is indicated as facing in the proper direction.

Following the attainment of the proper azimuthal position of the whipstock, pressure may be applied by release of the drill stem at the surface to drive the lower end of the whipstock into the earth and shear the pin securing the whipstock to the drill stem. As the shearing takes place, the apparatus will continue to indicate the azimuthal position of the whipstock, with the result that there is complete assurance that the whipstock has been set in the desired direction.

Thereupon the drilling may be immediately started by rotation of the drill stem with the conventional hook-up, the instrument being withdrawn during the drilling operation. Mud circulation may, of course, be provided by having the supporting cable pass through a suitable stuffing box arrangement, the circulation being interrupted only when it is necessary to remove the instrument upon its arrival at the surface.

It will be noted that the mere fact that the two flashes appear is a check upon the location of the instrument at a position with the coil 16 opposite the magnet 4, since, as soon as this coil is slightly removed from the region of the magnet, the flashes of the electrode 52 will cease. Thus a direct indication of the position of the whipstock and the proper operation of the apparatus are both definitely assured.

A cathode ray tube may be used to advantage in place of the arrangement described if the sweep voltage is controlled as to frequency. Many types of detecting apparatus may be provided to secure the identical fundamental effects.

In the above description it has been assumed that the azimuth is determined by means of a member responsive to the slope of the holes. The azimuth may, however, be indicated directly by arranging coil 18 as the coil of an earth inductor compass, in which case it should be well removed from magnet 4 so as to respond to the undisturbed earth's field, the instrument, its casing, and the sub of the drill stem being in this case of non-magnetic material. Alternatively, the coil may be affected by a pole of a compass needle which is arranged to respond to the earth's magnetic field. Or in still another arrangement, a magnet arranged to effect induction of pulses in the coil may be carried by a gyroscope to give a positive indication of direction.

What I claim and desire to protect by Letters Patent is:

1. The method of orienting a tool within a bore hole including lowering the tool into the bore hole on a hollow drill stem, the lower portion of which drill stem carries a magnetic element, lowering within the drill stem an instrument containing means for indicating a known azimuthal reference direction and means responsive to the magnetic field established by said magnetic element for transmitting to the surface indications of the relationship of the magnetic element to the azimuth indicating means, and rotating the drill stem to bring the tool into a predetermined azimuthal position upon noting said transmitted indications.

2. The method of orienting a tool within a bore hole including lowering the tool into the bore hole on a hollow drill stem, the lower portion of which drill stem carries a magnetic element, lowering within the drill stem an instrument containing means for indicating a known azimuthal reference direction and means responsive to the magnetic field established by said magnetic element for transmitting to the surface indications of the relationship of the magnetic element to the azimuth indicating means, and rotating the drill stem to bring the tool into a predetermined azimuthal position upon noting said transmitted indications, said indication transmitting means comprising devices for transforming the indications into electromagnetically induced impulses.

3. The method of orienting a tool within a bore hole including lowering the tool into the bore hole on a hollow drill stem, the lower portion of which drill stem is provided with means bearing a predetermined relationship to the tool carried thereby, lowering within the drill stem an instrument containing means for indicating a known azimuthal reference direction and means responsive to the location of the first mentioned means for transmitting to the surface indications of the relationship of said means at the lower portion of the drill stem to the azimuth indicating means, and rotating the drill stem to bring the tool into a predetermined azimuthal position upon noting said transmitted indications, said indication transmitting means comprising devices for transforming the indications into electromagnetically induced impulses.

4. The method of orienting a tool within a bore hole including lowering the tool into the bore hole on a hollow drill stem, the lower portion of which drill stem carries a magnetic element, lowering within the drill stem an instrument containing means for indicating a known azimuthal reference direction and means responsive to the magnetic field established by said magnetic element for transmitting to the surface pulses indicative of the relationship of the magnetic element to the azimuth indicating means, detecting the relationship of the transmitted pulses by means of a stroboscopic apparatus, and rotating the drill stem to bring the tool into a predetermined azimuthal position.

5. The method of orienting a tool within a bore hole including lowering the tool into the bore hole on a hollow drill stem, the lower portion of which drill stem is provided with means bearing a predetermined relationship to the tool carried thereby, lowering within the drill stem an instrument containing means for indicating a known azimuthal reference direction and means responsive to the location of the first mentioned means for transmitting to the surface periodic pulses indicative of the relationship of said means at the lower portion of the drill stem to the azimuth indicating means, detecting the relationship of the transmitted pulses by means of a stroboscopic apparatus, and rotating the drill stem to bring the tool into a predetermined azimuthal position.

6. In combination, a hollow drill stem; a tool carried by the drill stem; a magnetic element carried by the lower portion of the drill stem; and an instrument arranged to pass through the drill stem and arranged to occupy a predetermined final longitudinal position therein adjacent the tool and said magnetic element, said instrument containing means for indicating a known azimuthal reference direction and means responsive to the magnetic field established by said magnetic element for transmitting to the surface indications of the relationship of the magnetic element to the azimuth indicating means.

7. In combination, a hollow drill stem; a tool carried by the drill stem; a magnetic element carried by the lower portion of the drill stem; an instrument arranged to pass through the drill stem and arranged to occupy a predetermined final longitudinal position therein adjacent the tool and said magnetic element, said instrument containing means for indicating a known azimuthal reference direction and means responsive to the magnetic field established by said magnetic element for transmitting to the surface pulses indicative of the relationship of the magnetic elements to the azimuth indicating means; and a stroboscopic apparatus for detecting the relationship of the transmitted pulses.

8. In combination, a hollow drill stem; a tool carried by the drill stem; means provided at the lower portion of the drill stem bearing a predetermined relationship to the tool carried thereby; an instrument arranged to pass through the drill stem and arranged to occupy a predetermined final longitudinal position therein adjacent the tool and said means, said instrument containing means for indicating a known azimuthal reference direction and means responsive to the location of the first mentioned means for transmitting to the surface pulses indicative of the relationship of said means at the lower portion of the drill stem to the azimuth indicating means; and a stroboscopic apparatus for detecting the relationship of the transmitted pulses.

9. In combination, a hollow drill stem; a tool carried by the drill stem; means provided at the lower portion of the drill stem bearing a predetermined relationship to the tool carried thereby; an instrument arranged to pass through the drill stem and arranged to occupy a predetermined final longitudinal position therein adjacent the tool and said means, said instrument containing means for indicating a known azimuthal reference direction, and means responsive to the location of the first mentioned means for transmitting automatically periodically to the surface pulses indicative of the relationship of said means at the lower portion of the drill stem to the azimuth indicating means; and a stroboscopic apparatus for detecting the relationship of the transmitted pulses.

10. In combination, a hollow drill stem; a tool carried by the drill stem; a magnetic element carried by the lower portion of the drill stem and bearing a predetermined relationship to the tool carried thereby; an instrument arranged to pass through the drill stem and arranged to occupy a predetermined final longitudinal position therein adjacent the tool and said magnetic element, said instrument containing means for indicating a known azimuthal reference direction and means responsive to the magnetic field established by said magnetic element for transmitting automatically periodically to the surface pulses indicative of the relationship of said magnetic element at the lower portion of the drill stem to the azimuth indicating means; and a stroboscopic apparatus for detecting the relationship of the transmitted pulses.

11. In combination, a hollow drill stem; a tool carried by the drill stem; means provided at the lower portion of the drill stem bearing a predetermined relationship to the tool carried thereby; an instrument arranged to pass through the drill stem and arranged to occupy a predetermined final longitudinal position therein adjacent the tool and said means, said instrument containing means for indicating a known azimuthal reference direction and means responsive to the location of the first mentioned means for transmitting automatically periodically to the surface electromagnetically induced pulses indicative of the relationship of said means at the lower portion of the drill stem to the azimuth indicating means; and a stroboscopic apparatus for detecting the relationship of the transmitted pulses.

12. In combination, a hollow drill stem; a tool carried by the drill stem; a magnetic element carried by the lower portion of the drill stem and bearing a predetermined relationship to the tool carried thereby; an instrument arranged to pass through the drill stem and arranged to occupy a predetermined final longitudinal position therein adjacent the tool and said magnetic element, said instrument containing means for indicating a known azimuthal reference direction, and means responsive to the magnetic field established by said magnetic element for transmitting automatically periodically to the surface electromagnetically induced pulses indicative of the relationship of said magnetic element at the lower portion of the drill stem to the azimuth indicating means; and a stroboscopic apparatus for detecting the relationship of the transmitted pulses.

13. In combination, a hollow drill stem; a tool carried by the drill stem; a magnetic element carried by the lower portion of the drill stem; and an instrument arranged to pass through the drill stem and arranged to occupy a predetermined final longitudinal position therein adjacent the tool and said magnetic element, said instrument containing means for indicating a known azimuthal reference direction, and means responsive to the magnetic field established by said magnetic element for automatically periodically transmitting to the surface electromagnetically induced pulses indicative of the relationship of the magnetic element to the azimuth indicating means.

14. In combination, a hollow drill stem; a tool carried by the drill stem; means provided at the lower portion of the drill stem bearing a predetermined relationship to the tool carried thereby; and an instrument arranged to pass through the drill stem and arranged to occupy a predetermined final longitudinal position therein adjacent the tool and said means, said instrument containing means for indicating a known azimuthal reference direction and means responsive to the location of the first mentioned means for automatically periodically transmitting to the surface electromagnetically induced pulses indicative of the relationship of said means at the lower portion of the drill stem to the azimuth indicating means.

15. In combination, a hollow drill stem; a tool carried by the drill stem; a magnetic element carried by the lower portion of the drill stem and bearing a predetermined relationship to the tool carried thereby; means for indicating a known azimuthal reference direction, and means responsive to the magnetic field established by said magnetic element for transmitting to the surface electromagnetically induced pulses indicative of the relationship of the magnetic element to the azimuth indicating means.

16. In combination, a hollow drill stem; a tool carried by the drill stem; a magnetic element carried by the lower portion of the drill stem and bearing a predetermined relationship to the tool carried thereby; means for indicating a known azimuthal reference direction, and means responsive to the magnetic field established by said magnetic element for automatically periodically transmitting to the surface pulses indicative of the relationship of the magnetic element to the azimuth indicating means.

17. In combination, a hollow drill stem; a tool carried by the drill stem; means provided at the lower portion of the drill stem bearing a predetermined relationship to the tool carried thereby; means for indicating a known azimuthal reference direction, and means responsive to the location of the first mentioned means for transmitting to the surface electromagnetically induced pulses indicative of the relationship of said means at the lower portion of the drill stem to the azimuth indicating means.

18. In combination, a hollow drill stem; a tool carried by the drill stem; means provided at the lower portion of the drill stem bearing a predetermined relationship to the tool carried thereby; means for indicating a known azimuth reference direction, and means responsive to the location of the first mentioned means for automatically periodically transmitting to the surface pulses indicative of the relationship of said means at the lower portion of the drill stem to the azimuth indicating means.

19. In combination, a hollow drill stem; a tool carried by the drill stem; a magnetic element carried by the lower portion of the drill stem and bearing a predetermined relationship to the tool carried thereby; means for indicating a known azimuthal reference direction; means responsive to the magnetic field established by said magnetic element for automatically periodically transmitting to the surface pulses indicative of the relationship of the magnetic element to the azimuth indicating means; and a stroboscopic apparatus for detecting the relationship of the transmitted pulses.

20. In combination, a hollow drill stem; a tool carried by the drill stem; means provided at the lower portion of the drill stem bearing a predetermined relationship to the tool carried thereby; means for indicating a known azimuthal reference direction; means responsive to the location of the first mentioned means for automatically periodically transmitting to the surface pulses indicative of the relationship of said means at the lower portion of the drill stem to the azimuth indicating means; and a stroboscopic apparatus for detecting the relationship of the transmitted pulses.

DONALD HERING.

REFERENCES CITED

The following references are of record in the file of this patent:

UNITED STATES PATENTS

| Number | Name | Date |
| --- | --- | --- |
| 1,209,102 | Anschutz-Kaempfe | Dec. 19, 1916 |
| 1,928,970 | Johnston | Oct. 3, 1933 |
| 1,980,100 | Schlumberger | Nov. 6, 1934 |
| 2,033,135 | Fay et al. | Mar. 10, 1936 |
| 2,120,670 | Hyer | June 14, 1938 |
| 2,192,863 | Hetzel et al. | Mar. 5, 1940 |
| 2,228,623 | Ennis | Jan. 14, 1941 |
| 2,246,542 | Smith | June 24, 1941 |
| 2,263,859 | Eldredge | Nov. 25, 1941 |
| 2,282,431 | Smith et al. | May 12, 1942 |
| 2,288,876 | Arnold | July 7, 1942 |
| 2,327,658 | Miller | Aug. 24, 1943 |
| 2,012,138 | Palmer et al. | Aug. 20, 1935 |
| 2,317,632 | Miller | Apr. 27, 1943 |